(12) United States Patent
Chen et al.

(10) Patent No.: US 12,092,893 B2
(45) Date of Patent: Sep. 17, 2024

(54) OPTICAL IMAGING LENS

(71) Applicant: GENIUS ELECTRONIC OPTICAL (XIAMEN) CO., LTD., Fujian (CN)

(72) Inventors: Wensen Chen, Fujian (CN); Chuzi Wei, Fujian (CN)

(73) Assignee: GENIUS ELECTRONIC OPTICAL (XIAMEN) CO., LTD., Fujian (CN)

( * ) Notice: Subject to any disclaimer, the term of this patent is extended or adjusted under 35 U.S.C. 154(b) by 547 days.

(21) Appl. No.: 17/022,101

(22) Filed: Sep. 16, 2020

(65) Prior Publication Data

US 2022/0043239 A1 Feb. 10, 2022

(30) Foreign Application Priority Data

Aug. 10, 2020 (CN) .......................... 202010794978.5

(51) Int. Cl.
*G02B 7/02* (2021.01)
(52) U.S. Cl.
CPC .................... *G02B 7/021* (2013.01)
(58) Field of Classification Search
CPC .... G02B 13/0045; G02B 5/003; G02B 7/021; G02B 9/60
See application file for complete search history.

(56) References Cited

U.S. PATENT DOCUMENTS

2021/0247584 A1* 8/2021 Chang .................. G02B 13/002

FOREIGN PATENT DOCUMENTS

CN 205899116 U * 1/2017 ............. G02B 7/021

OTHER PUBLICATIONS

CN-205899116-U, translation (Year: 2017).*

* cited by examiner

*Primary Examiner* — Wen Huang
(74) *Attorney, Agent, or Firm* — JCIPRNET

(57) ABSTRACT

An optical imaging lens includes a lens barrel, a plurality of lens elements, and a light-shielding element. The lens barrel has a mounting portion. Each of the lens elements has an object-side mechanic surface facing an object side and an image-side mechanic surface facing an image side. A material of the light-shielding element is metal or plastic. The optical imaging lens satisfies the following conditional expressions depending on the material of the light-shielding element: $-200~\mu m < RA1-RA2 \leq 450~\mu m$, or $-200~\mu m \geq RA1-RA2 \geq -300~\mu m$. The mounting portion can carry the light-shielding element and has a carrying surface facing the image side. There is a minimum distance between the carrying surface and an optical element closest to the carrying surface in a direction parallel to an optical axis. The minimum distance is less than or equal to $5{,}000~\mu m$. Furthermore, other optical imaging lenses are provided.

7 Claims, 12 Drawing Sheets

OPTICAL IMAGING LENS

CROSS-REFERENCE TO RELATED APPLICATION

This application claims the priority benefit of China application serial no. 202010794978.5, filed on Aug. 10, 2020. The entirety of the above-mentioned patent application is hereby incorporated by reference herein and made a part of this specification.

BACKGROUND

Technical Field

The disclosure relates to an optical system, and particularly, to an optical imaging lens.

Description of Related Art

In recent years, as the optical imaging lens continues to evolve, in addition to the requirement for a light weight and a small size of the lens, the imaging quality of the lens is similarly important. Parameters such as the surface configurations of the lens elements, the air gap between the lens elements, etc. affect the optical imaging quality. Moreover, the stability of the lens elements and the light-shielding elements in the assembly process is also a major factor affecting the optical imaging quality.

In order to develop better optical imaging quality and reduce the area ratio of the lens to the screen of the portable electronic device, the maximum radius of the lens element closest to the object side is designed to be smaller and smaller, and the maximum radius of the lens element closer to the image side is designed to be larger. In addition, in the conventional optical imaging lens, even if the distance between the optical element and the carrying surface of the mounting portion of the lens barrel is small, a distance of 30 μm or more is generally maintained, so that the burrs of the lens elements would not collide with the mounting portion and cause imprecision in assembly. When the maximum outer diameter of a lens element is much larger than the maximum outer diameter of a preceding lens element, in the assembly process, issues such as torque imbalance may occur among the optical elements (e.g., the lens elements, the light-shielding elements, and the mounting portion of the lens barrel), which may cause deformation of the light-shielding element or eccentricity of the entire optical imaging lens and further affect the optical imaging quality. In view of the above, the disclosure provides a technically feasible optical imaging lens which can improve the assembly yield while maintaining excellent optical imaging quality.

SUMMARY

The disclosure provides an optical imaging lens, which exhibits excellent assembly yield and optical imaging quality.

An embodiment of the disclosure provides an optical imaging lens including a lens barrel, a plurality of lens elements, and a light-shielding element. The lens barrel has a mounting portion. The lens elements are sequentially disposed along an optical axis of the optical imaging lens from an object side to an image side, and each of the lens elements has an object-side mechanic surface facing the object side and an image-side mechanic surface facing the image side. The object-side mechanic surfaces and the image-side mechanic surfaces are each configured to receive a bearing force. A material of the light-shielding element is metal. A vertical distance from an inner edge of the object-side mechanic surface of a lens element in a first order counted from the light-shielding element toward the image side to the optical axis is RA1, and a vertical distance from an outer edge of the image-side mechanic surface of a lens element in a first order counted from the light-shielding element toward the object side to the optical axis is RA2. The optical imaging lens satisfies the following conditional expression: $-200 \text{ μm} < \text{RA1} - \text{RA2} \leq 450 \text{ μm}$. The mounting portion is capable of carrying the light-shielding element, and the mounting portion has a carrying surface facing the image side. A minimum distance is present between the carrying surface and an optical element closest to the carrying surface in a direction parallel to the optical axis. The minimum distance is less than or equal to 5,000 μm.

An embodiment of the disclosure provides an optical imaging lens including a lens barrel, a plurality of lens elements, and a light-shielding element. The lens barrel has a mounting portion. The lens elements are sequentially disposed along an optical axis of the optical imaging lens from an object side to an image side, and each of the lens elements has an object-side mechanic surface facing the object side and an image-side mechanic surface facing the image side. The object-side mechanic surfaces and the image-side mechanic surfaces are each configured to receive a bearing force. A material of the light-shielding element is plastic. A vertical distance from an inner edge of the object-side mechanic surface of a lens element in a first order counted from the light-shielding element toward the image side to the optical axis is RA1, and a vertical distance from an outer edge of the image-side mechanic surface of a lens element in a first order counted from the light-shielding element toward the object side to the optical axis is RA2. The optical imaging lens satisfies the following conditional expression: $-200 \text{ μm} \geq \text{RA1} - \text{RA2} \geq 300 \text{ μm}$. The mounting portion is capable of carrying the light-shielding element, and the mounting portion has a carrying surface facing the image side. A minimum distance is present between the carrying surface and an optical element closest to the carrying surface in a direction parallel to the optical axis. The minimum distance is less than or equal to 5,000 μm.

An embodiment of the disclosure provides an optical imaging lens including a lens barrel, at least three lens elements, and a light-shielding element. The lens barrel has a mounting portion. The at least three lens elements are sequentially disposed along an optical axis of the optical imaging lens from an object side to an image side, and each of the lens elements has an object-side mechanic surface facing the object side and an image-side mechanic surface facing the image side, and the object-side mechanic surfaces and the image-side mechanic surfaces are each configured to receive a bearing force. The light-shielding element is disposed between a lens element in a first order and a lens element in a third order counted from the object side toward the image side. A vertical distance from an outer edge of a lens element in a first order counted from the light-shielding element toward the image side to the optical axis is D1, and a vertical distance from an outer edge of a lens element in a first order counted from the light-shielding element toward the object side to the optical axis is D2. The optical imaging lens satisfies the following conditional expression: $300 \text{ μm} \leq \text{D1} - \text{D2}$. A vertical distance from an inner edge of the object-side mechanic surface of a lens element in a second order counted from the light-shielding element toward the image side to the optical axis is RA4, and a vertical distance from an outer edge of the image-side mechanic surface of a lens element in a first order counted from the light-shielding element toward the image side to the optical axis is RA3. The optical imaging lens satisfies the following conditional expression: RA4−RA3≤−230 μm. The mounting portion is capable of carrying a lens element in a first order counted from the light-shielding element toward the image side, and the mounting portion has a carrying surface facing the image side. A minimum distance is present between the carrying surface and an optical element closest to the carrying surface in a direction parallel to the optical axis. The minimum distance is less than or equal to 5,000 μm.

An embodiment of the disclosure provides an optical imaging lens including a lens barrel and at least three lens elements. The lens barrel has a mounting portion. The at least three lens elements are sequentially disposed along an optical axis of the optical imaging lens from an object side to an image side, and each of the lens elements has an object-side mechanic surface facing the object side and an image-side mechanic surface facing the image side. The object-side mechanic surfaces and the image-side mechanic surfaces are each configured to receive a bearing force. The at least three lens elements include a first lens element and a second lens element. The first lens element is closer to the image side than the second lens element. No lens element is disposed between the first lens element and the second lens element. A vertical distance from an outer edge of the first lens element to the optical axis minus a vertical distance from an outer edge of the second lens element to the optical axis is larger than or equal to 300 μm. The at least three lens elements include a third lens element. The third lens element is closer to the image side than the first lens element, and no lens element is disposed between the third lens element and the first lens element. A vertical distance from an inner edge of the object-side mechanic surface of the third lens element to the optical axis minus a vertical distance from an outer edge of the image-side mechanic surface of the first lens element to the optical axis is less than or equal to −230 μm. The mounting portion is capable of carrying the first lens element, and the mounting portion has a carrying surface facing the image side. A minimum distance is present between the carrying surface and an optical element closest to the carrying surface in a direction parallel to the optical axis, and the minimum distance is less than or equal to 5,000 μm.

Based on the above, in the optical imaging lens of the embodiment of the disclosure, with the above combinations of different conditions satisfied, excellent assembly yield and excellent optical imaging quality can be achieved.

To make the aforementioned more comprehensible, several embodiments accompanied with drawings are described in detail as follows.

DESCRIPTION OF THE EMBODIMENTS

Figure 1:
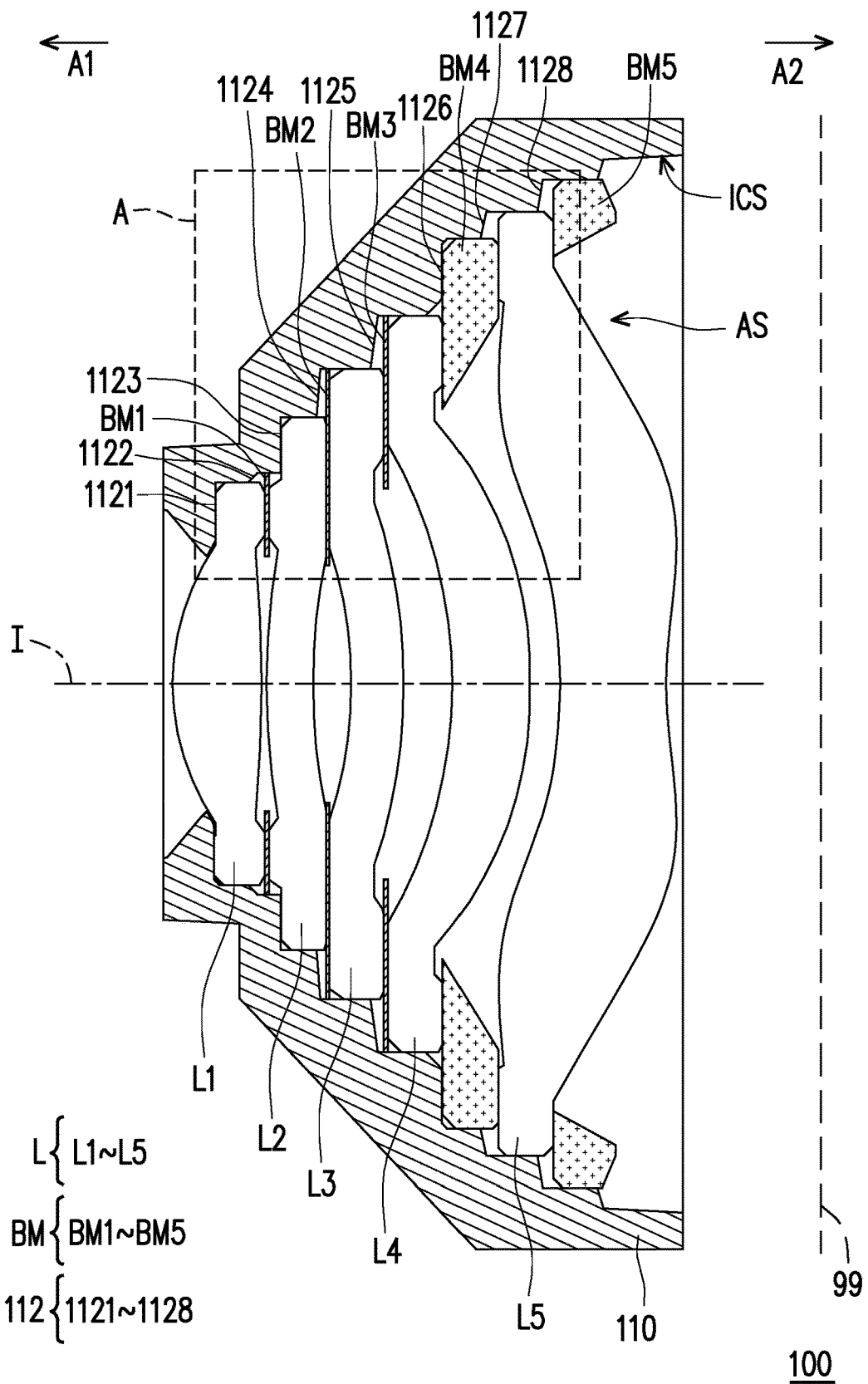
FIG. 1 is a schematic cross-sectional view showing an optical imaging lens according to an embodiment of the disclosure.
Figure 2A:
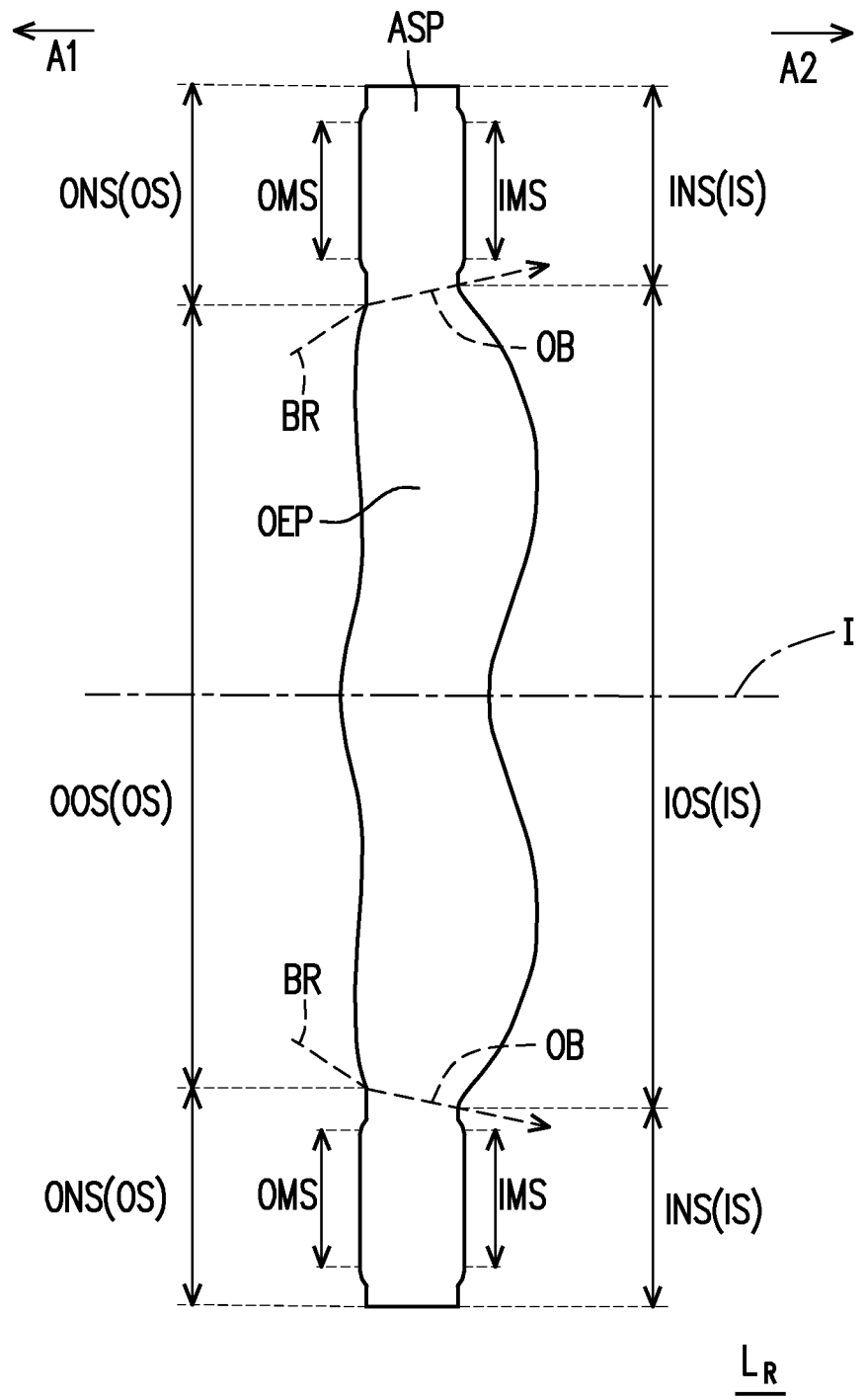
FIG. 2A and FIG. 2B are respectively schematic radial views showing different reference lens elements applicable to the optical imaging lens of the embodiment of the disclosure.
Figure 2B:
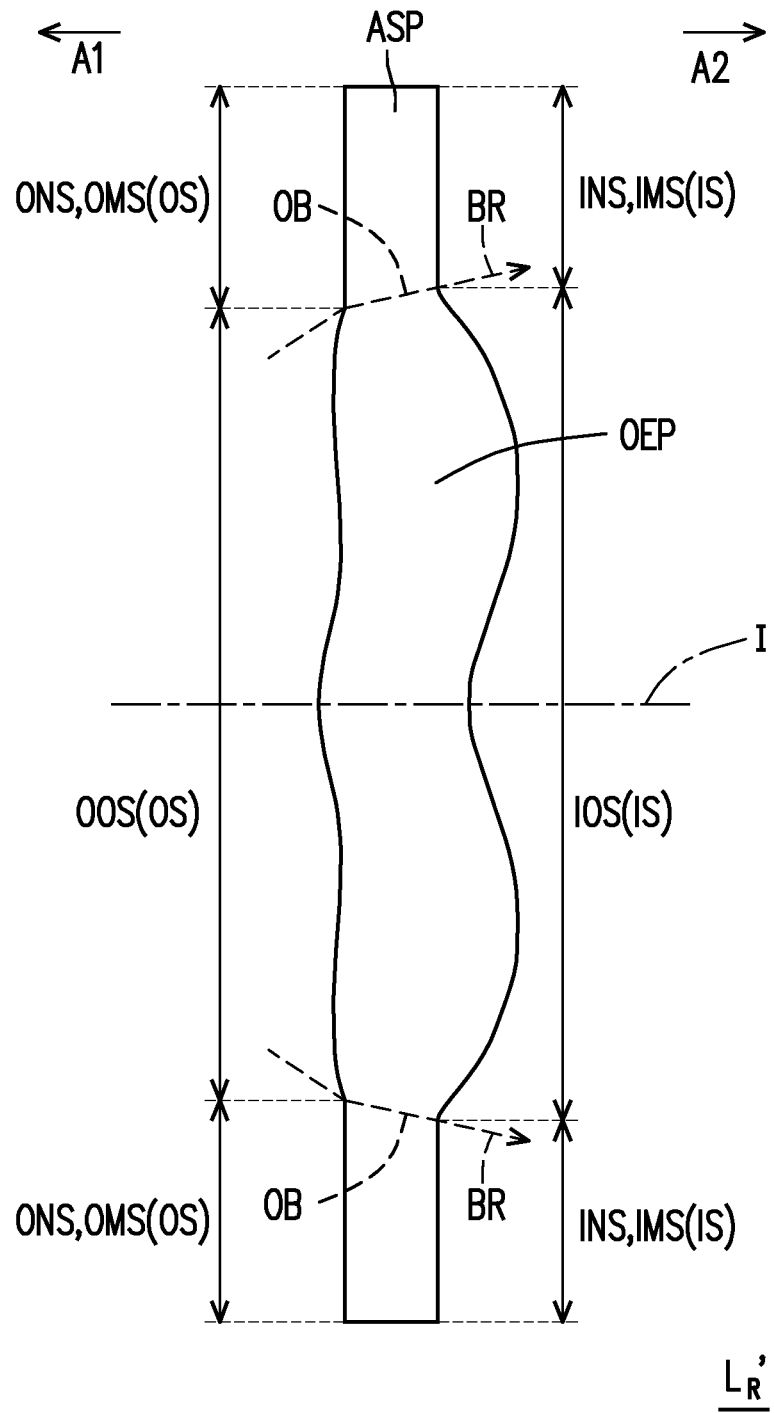
Figure 3:
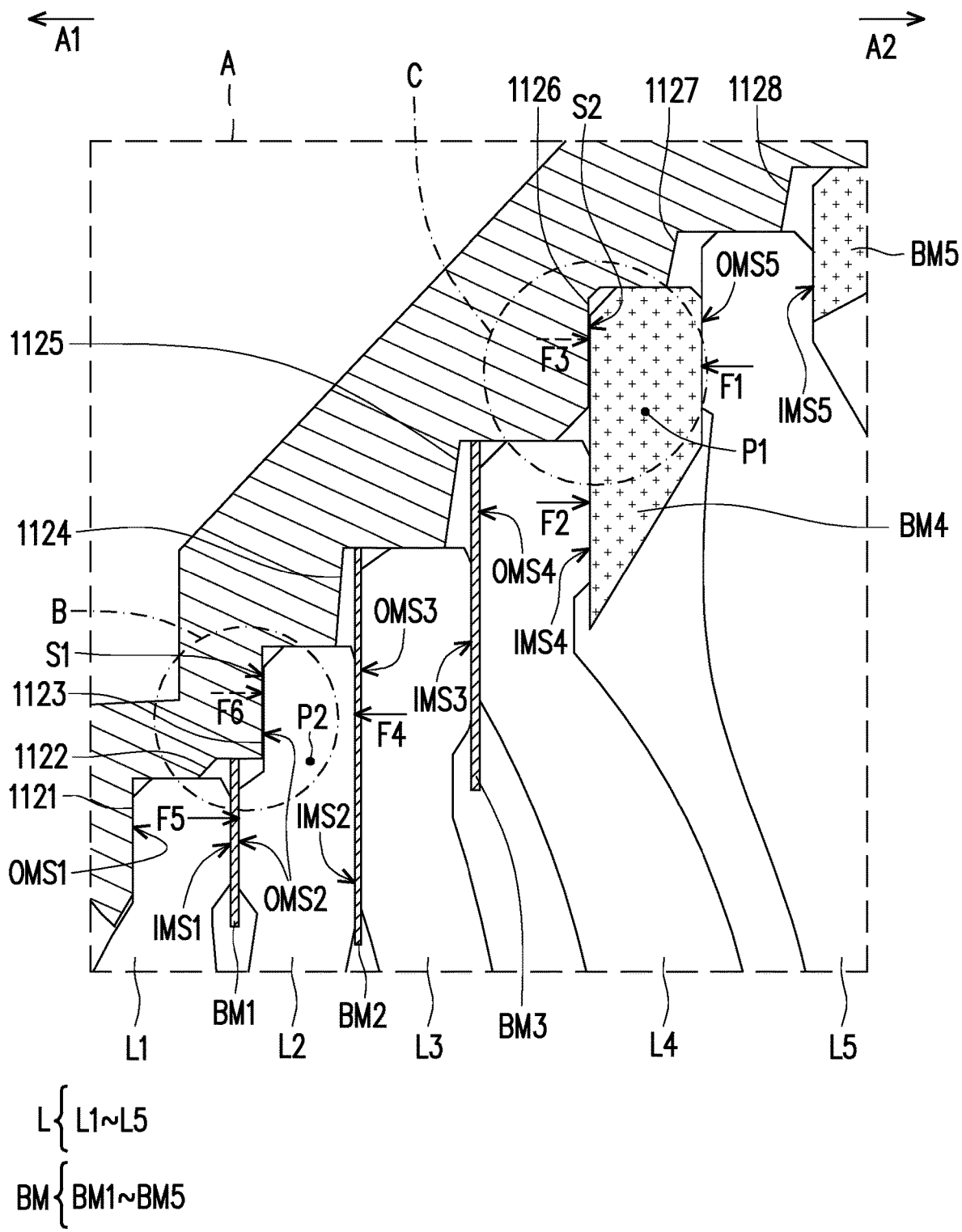
FIG. 3 is a schematic enlarged view showing region A in FIG. 1.
Figure 4:
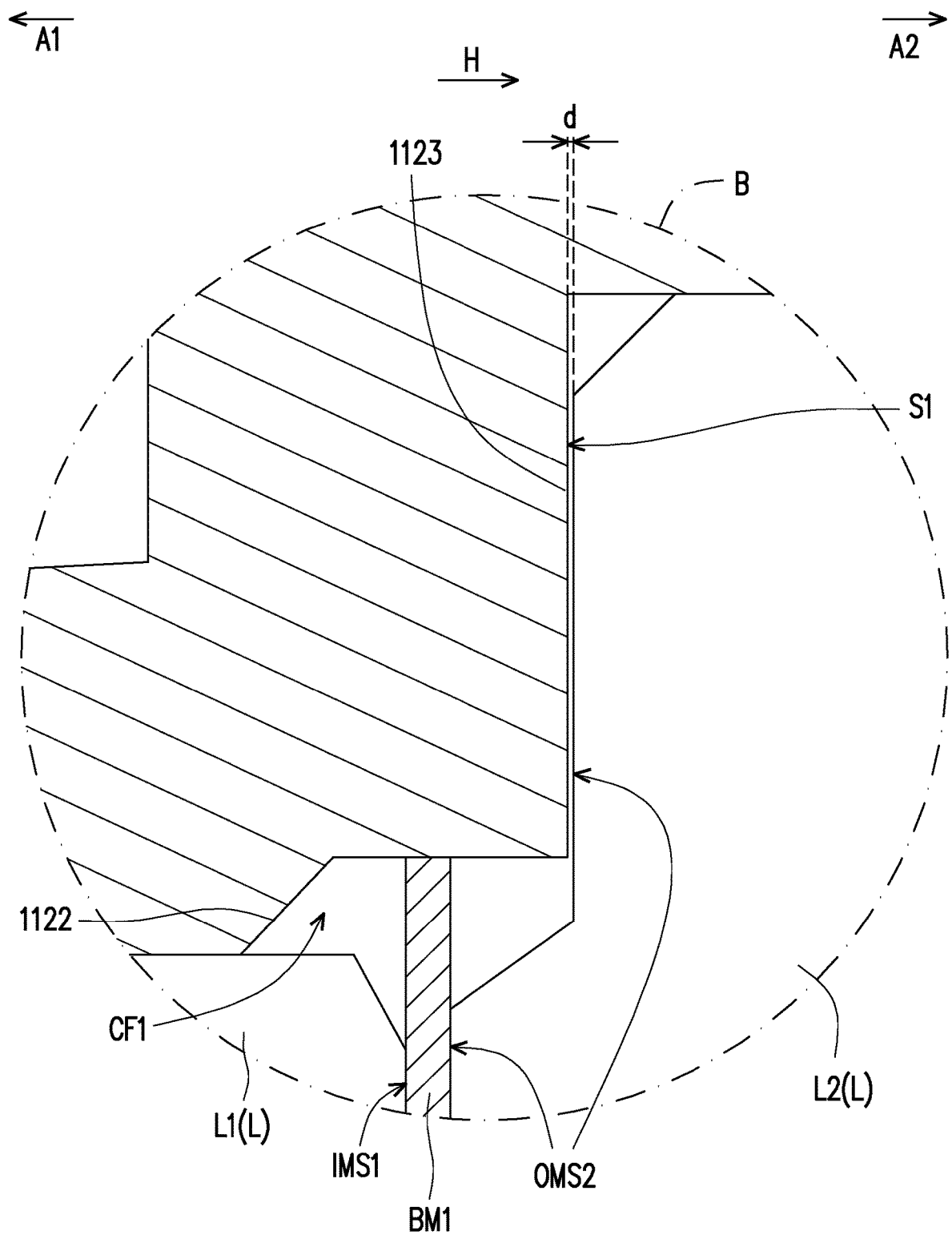
FIG. 4 and FIG. 5 are respectively schematic enlarged views showing regions B and C in FIG. 3.
Figure 5:
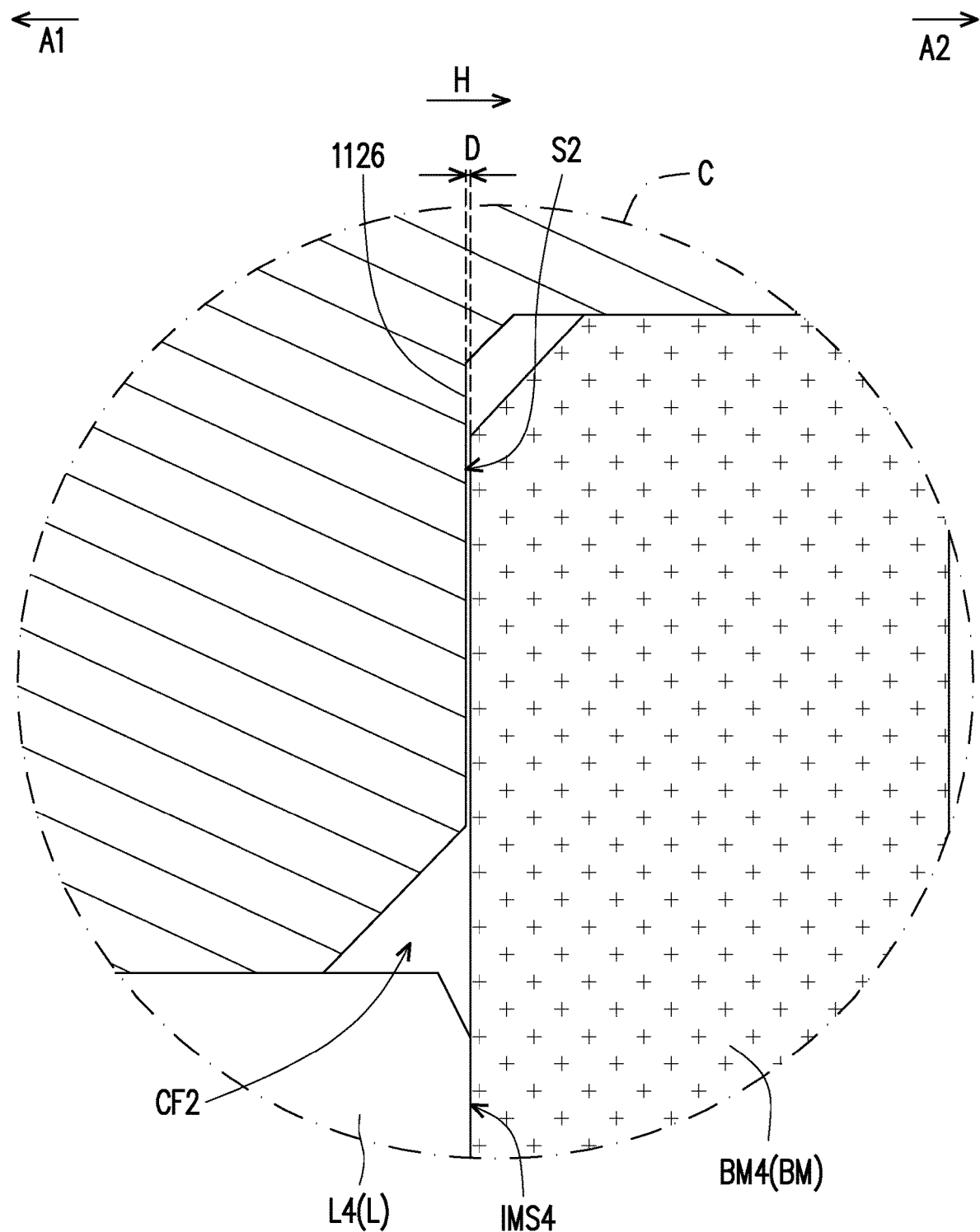
Figure 6:
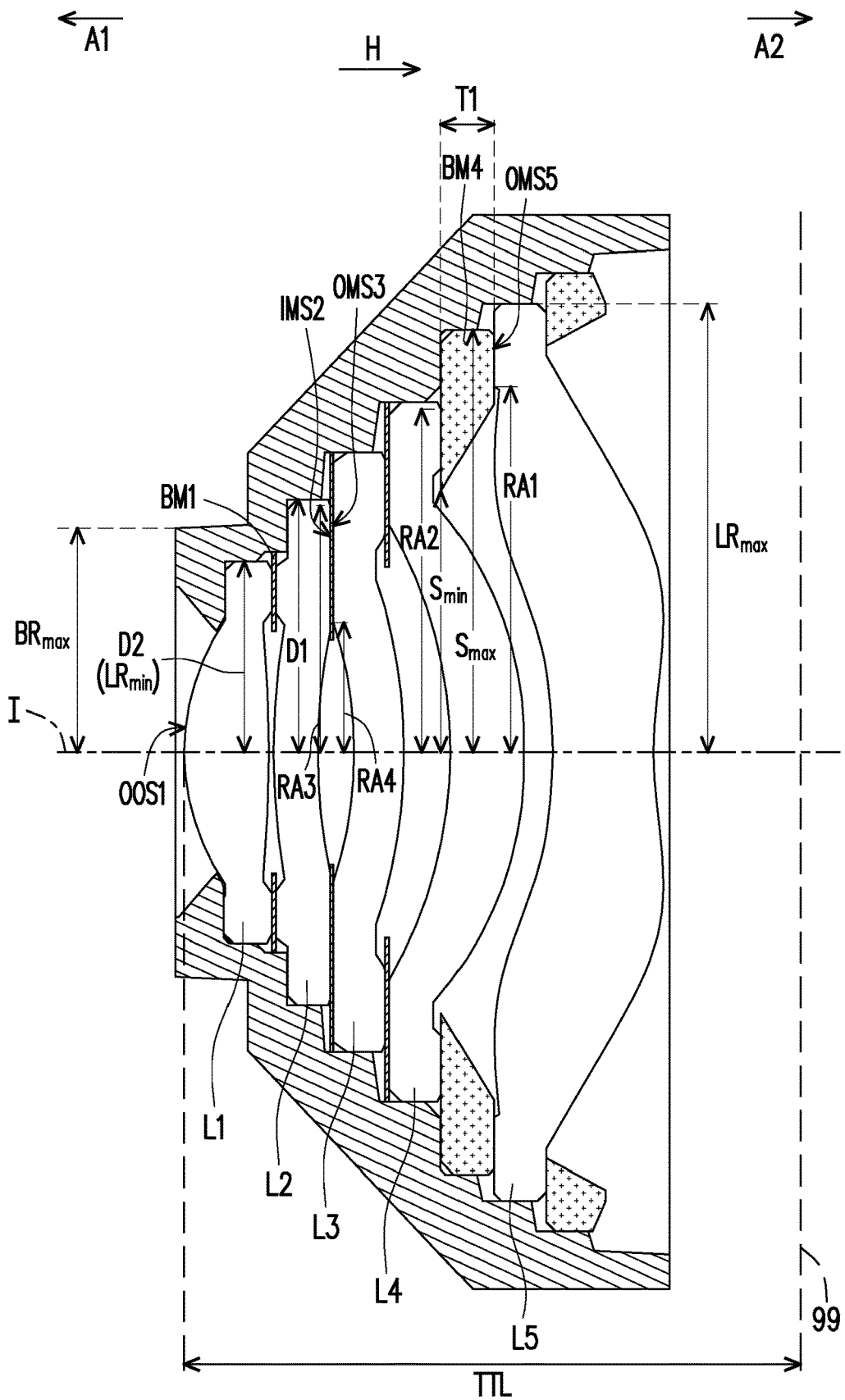
FIG. 6 is a schematic view showing various parameters of the embodiment in FIG. 1.

FIG. 1 is a schematic cross-sectional view showing an optical imaging lens according to an embodiment of the disclosure. FIG. 2A and FIG. 2B are respectively schematic radial views showing different reference lens elements applicable to the optical imaging lens of the embodiment of the disclosure. FIG. 3 is a schematic enlarged view showing region A in FIG. 1. FIG. 4 and FIG. 5 are respectively schematic enlarged views showing regions B and C in FIG. 3. FIG. 6 is a schematic view showing various parameters of the embodiment in FIG. 1.

Referring to FIG. 1, in this embodiment, an optical imaging lens 100 may be applied to a portable electronic device (e.g., a mobile phone), but the disclosure is not limited to its application. The optical imaging lens 100 includes a lens barrel 110, a plurality of lens elements L, and a plurality of light-shielding elements BM. The lens elements L and the light-shielding elements BM are also generally referred to as optical elements since they have optical functions. The above elements will be described in detail in the following paragraphs.

The lens barrel 110 is an element configured for mounting the lens elements L and serves a function of protecting the lens elements L and the internal optical path of the optical imaging lens 100. The lens barrel 110 has an inner circumferential surface ICS surrounding an optical axis I, and the inner circumferential surface ICS defines a mounting space AS configured to accommodate the above optical elements. The inner circumferential surface ICS is provided with a plurality of mounting portions (or referred to as steps) 112 disposed around the optical axis I, and the mounting portions 112 are sequentially arranged along the optical axis I. The number of the mounting portions 112 is eight, for example, and the mounting portions 112 are respectively labeled as 1121 to 1128.

Each of the lens elements L (or referred to as lenses) is, for example, an optical element having a refracting power. In the embodiment of the disclosure, the number of the lens elements L is at least three. In FIG. 1, the optical imaging lens 100 includes, for example, five lens elements L1 to L5. In other embodiments, the number of the lens elements may be six, seven, more than eight, or a number less than five such as three or four. The number is only an example, and the disclosure is not limited to the number of lens elements.

Reference lens elements $L_R$ and $L_R'$ in FIG. 2A and FIG. 2B will be described as examples of the lens elements L. Specifically, the reference lens elements $L_R$ and $L_R'$ (or each lens element L) has an object-side surface OS facing an object side A1 and an image-side surface IS facing an image side A2. In the object-side surface OS and the image-side surface IS, depending on the functions, the object-side surface OS further includes an object-side optically effective surface OOS and an object-side optically non-effective surface ONS connected to each other, and the image-side surface IS further includes an image-side optically effective surface IOS and an image-side optically non-effective surface INS connected to each other. In the following paragraphs, the surfaces of different functions will be described in separate paragraphs.

Assuming that the reference lens elements $L_R$ and $L_R'$ may receive an imaging ray BR which is incident on the optical imaging lens 100 and is in an angle range from being parallel to the optical axis I to within the half field of view (HFOV) with respect to the optical axis I. After sequentially passing through part of the object-side surface OS and the image-side surface IS of the lens elements $L_R$ and $L_R'$, the imaging ray BR forms an image on an image plane (not shown) at the rear end. The partial surface of the object-side surface OS through which the imaging ray BR passes is the object-side optically effective surface OOS, the partial surface of the image-side surface IS through which the imaging ray BR passes is the image-side optically effective surface IOS, and the path along which the imaging ray BR incident on the lens element $L_R$ at the maximum angle travels within the lens elements $L_R$ and $L_R'$ is defined as an optical boundary OB. From another perspective, the part of the entire lens elements $L_R$ and $L_R'$ through which the imaging ray BR passes is referred to as an optically effective portion OEP. The surface of the optically effective portion OEP facing the object side A1 is referred to as the object-side optically effective surface OOS, and the surface facing the image side A2 is referred to as the image-side optically effective surface IOS.

In addition, the lens elements $L_R$ and $L_R'$ include an assembly portion ASP extending radially outward from the optical boundary OB. The assembly portion ASP is generally configured for assembling the lens elements $L_R$ and $L_R'$ to the lens barrel 110. The imaging ray BR does not reach the assembly portion ASP, so the assembly portion ASP may also be regarded as the optically non-effective portion in the lens elements $L_R$ and $L_R'$, and the surface of the assembly portion ASP facing the object side A1 is the object-side optically non-effective surface ONS, and the surface facing the image side A2 is the image-side optically non-effective surface INS. Since the assembly portion ASP is the main part of the lens elements $L_R$ and $L_R'$ that bears a force, at least a part of the surface of the object-side optically non-effective surface ONS and the image-side optically non-effective surface INS is a surface to be subjected to a force (e.g., being subjected to a force in an assembly process or when leaning against an optical element), or a surface actually in contact with the optical element. Therefore, the surface in the object-side optically non-effective surface ONS configured to bear a force is referred to as an object-side mechanic surface OMS, and the surface in the image-side optically non-effective surface INS configured to bear a force is referred to as an image-side mechanic surface IMS. FIG. 2A shows that the areas of the object-side mechanic surface OMS and the image-side mechanic surface IMS are respectively smaller than the areas of the object-side optically non-effective surface ONS and the image-side optically non-effective surface INS, and FIG. 2B shows that the areas of the object-side mechanic surface OMS and the image-side mechanic surface IMS are respectively equal to the areas of the object-side optically non-effective surface ONS and the image-side optically non-effective surface INS. Both types of lens elements may be applied to the optical imaging lens of the embodiment of the disclosure, and particularly, the design of FIG. 2A may leave a space at the assembly portion ASP, so that the burrs of the optical elements do not collide with each other, and a higher assembly yield can be achieved.

It is noted that the surface configurations of the lens elements $L_R$, $L_R'$, and L in the drawings of the disclosure are only illustrative and are not intended to limit the scope of the disclosure.

The light-shielding elements BM generally refer to optical elements capable of shielding a light beam, and in this embodiment, the light-shielding elements BM are, for example, spacers or light-shielding sheets. Specifically, in this embodiment, the number of the light-shielding elements BM is five, for example, and the light-shielding elements BM are respectively labeled as BM1 to BM5, where the light-shielding elements BM1 to BM3 are light-shielding sheets, and the light-shielding elements BM4 and BM5 are spacers. In this embodiment, the material of the light-shielding elements BM may be metal which has stronger structural strength, or plastic which is lighter and has a higher manufacturing yield.

In the following paragraphs, the arrangement relationships and optical effects of the above elements will be described in detail.

Referring to FIG. 1, in the optical imaging lens 100, the lens elements L are sequentially arranged along an optical axis I of the optical imaging lens 100 from an object side A1 to an image side A2. Referring to FIG. 3 to FIG. 5, when viewed from the object side A1 toward the image side A2, the lens element L1 is directly supported against the mounting portion 1121 by its object-side mechanic surface OMS1. The light-shielding element BM1 is interposed between the image-side mechanic surface IMS1 of the lens element L1 and the object-side mechanic surface OMS2 of the lens element L2. The object-side mechanic surface OMS2 of the lens element L2 is directly supported against the light-shielding element BM1 and has a gap d with respect to the mounting portion 1123 in a direction H parallel to the direction of the optical axis I (as shown in FIG. 4). The object-side mechanic surface OMS3 of the lens element L3 is directly supported against the light-shielding element BM2. The light-shielding element BM3 is interposed between the image-side mechanic surface IMS3 of the lens element L3 and the object-side mechanic surface OMS4 of the lens element L4. The object-side mechanic surface OMS4 of the lens element L4 is directly supported against the light-shielding element BM3. The light-shielding element BM4 is interposed between the image-side mechanic surface IMS4 of the lens element L4 and the object-side mechanic surface OMS5 of the lens element L5, and a gap D is present between the light-shielding element BM4 and the mounting portion 1126 in the direction H parallel to the direction of the optical axis I (as shown in FIG. 5). The object-side mechanic surface OMS5 of the lens element L5 is directly supported against the light-shielding element BM4. The light-shielding element BM5 is directly supported against the image-side mechanic surface IMS5 of the lens element L5. In addition, the outer edges of the lens elements L1 to L5 respectively abut against the mounting portions 1121, 1123, 1124, 1125, and 1127. The outer edges of the light-shielding element BM1 to BM5 respectively abut against the mounting portions 1122, 1124, 1125, 1126, and 1128. When a ray emitted by an object to be photographed (not shown) enters the optical imaging lens 100 from the object side A1 and passes through the lens element L1 to the lens element L5, an image is formed on an image plane 99.

It is noted that the object side A1 is the side toward the object to be photographed, and the image side A2 is the side toward the image plane 99.

In the following paragraphs, the parameters of the embodiment of the disclosure will be described in detail with reference to FIG. 4 to FIG. 6.

Referring to FIG. 1 to FIG. 6, first, each lens element L has an outer edge farthest from the optical axis I, the object-side mechanic surface OMS has an inner edge closest to the optical axis I and an outer edge farthest from the optical axis I, and the image-side mechanic surface IMS has an inner edge closest to the optical axis I and an outer edge farthest from the optical axis I. Referring to FIG. 3, the mounting portion 1123 has a carrying surface S1 facing the image side A1, the mounting portion 1126 has a carrying surface S2 facing the image side A1, and the carrying surfaces S1 and S2 are configured to carry the closest optical elements. Specifically, in this embodiment, the optical element closest to the carrying surface S1 is the lens element L2, and the carrying surface S1 is configured to carry the lens element L2 (as shown in FIG. 4). The optical element closest to the carrying surface S2 is the light-shielding element BM4, and the carrying surface S2 is configured to carry the light-shielding element BM4 (as shown in FIG. 5). Next, the following parameters are defined:

RA1 is the vertical distance from the inner edge of the object-side mechanic surface OMS5 of the lens element L5 (i.e., the lens element in a first order counted from the light-shielding element BM4 toward the image side A2) to the optical axis I (the distance from the inner edge to the optical axis I is also referred to as an inner edge distance), as shown in FIG. 6;

RA2 is the vertical distance from the outer edge of the image-side mechanic surface IMS4 of the lens element L4 (i.e., the lens element in a first order counted from the light-shielding element BM4 toward the object side A1) to the optical axis I (the distance from the outer edge to the optical axis I is also referred to as an outer edge distance), as shown in FIG. 6;

RA3 is the vertical distance from the outer edge of the image-side mechanic surface IMS2 of the lens element L2 (i.e., the lens element in a first order counted from the light-shielding element BM1 toward the image side A2) to the optical axis I, as shown in FIG. 6;

RA4 is the vertical distance from the inner edge of the object-side mechanic surface OMS3 of the lens element L3 (i.e., the lens element in a second order counted from the light-shielding element BM1 toward the image side A2; or referred to as a third lens element) to the optical axis I, as shown in FIG. 6;

d is the minimum distance between the carrying surface S1 of the mounting portion 1123 and the optical element (e.g., the lens element L2) closest to the carrying surface S1 in the direction H parallel to the optical axis I, as shown in FIG. 4;

D is the minimum distance between the carrying surface S2 of the mounting portion 1126 and the optical element (e.g., the light-shielding element BM4) closest to the carrying surface S2 in the direction H parallel to the optical axis I, as shown in FIG. 5;

T1 is the maximum thickness of the light-shielding element BM4 in the direction H parallel to the optical axis I, as shown in FIG. 6;

D1 is the vertical distance from the outer edge of the lens element L2 (i.e., the lens element in a first order counted from the light-shielding element BM1 toward the image side A2; or referred to as a first lens element) to the optical axis I, as shown in FIG. 6;

D2 is the vertical distance from the outer edge of the lens element L1 (i.e., the lens element in a first order counted from the light-shielding element BM1 toward the object side A1; or referred to as a second lens element) to the optical axis I, as shown in FIG. 6;

$S_{max}$ is the maximum outer diameter of the light-shielding element BM4, i.e., the distance from the outer edge of the light-shielding element BM4 to the optical axis I, as shown in FIG. 6;

$S_{min}$ is the minimum inner diameter of light-shielding element BM4, i.e., the distance from the inner edge of light-shielding element BM4 to the optical axis I, as shown in FIG. 6;

$LR_{max}$ is the maximum value among the outer edge distances of the lens elements L, as shown in FIG. 6;

$LR_{min}$ is the minimum value among the outer edge distances of the lens elements L, as shown in FIG. 6;

$BR_{max}$ is the maximum value of the vertical distance from the outer edge of the lens barrel 110 closest to the object side A1 to the optical axis I, as shown in FIG. 6; and TTL is the distance from the object-side optically effective surface OOS1 of the lens element L1 closest to the object side A1 in the optical imaging lens 100 to the image plane 99 along the optical axis I, as shown in FIG. 6.

In the following paragraphs, the technical effects achieved by the geometric design of this embodiment will be described in detail.

Referring to FIG. 3, FIG. 5, and FIG. 6 at the same time, in the optical imaging lens 100, the object-side mechanic surface OMS5 of the lens element L5 (i.e., the lens element in a first order counted from the light-shielding element BM4 toward the image side A2) and the image-side mechanic surface IMS4 of the lens element L4 (i.e., the lens element in a first order counted from the light-shielding element BM4 toward the object side A1) satisfy one of the following conditions:

1. $-200 \ \mu m < RA1 - RA2 \leq 450 \ \mu m$, and the material of the light-shielding element BM4 is metal.

2. $-200 \ \mu m \geq RA1 - RA2 \geq 300 \ \mu m$, and the material of the light-shielding element BM4 is plastic.

Moreover, the optical imaging lens 100 further satisfies the following conditional expression: $D \leq 5,000 \ \mu m$, where D is the minimum distance between the carrying surface S2 of the mounting portion 1126 facing the image side A2 and the optical element closest to the carrying surface S2.

Referring to FIG. 3, as RA1 represents the distance from the inner edge of the object-side mechanic surface OMS5 of the lens element L5 succeeding the light-shielding element BM4 to the optical axis I, and RA2 represents the distance from the inner edge of the image-side mechanic surface IMS4 of the lens element L4 preceding the light-shielding element BM4 to the optical axis I, the range in the above Condition 1 may be divided into two Sub-conditions a and b, namely:

a. the light-shielding element BM4 is metal, and the following is satisfied: $0 \ \mu m \leq RA1 - RA2 \leq 450 \ \mu m$;

b. the light-shielding element BM4 is metal, and the following is satisfied: $-200 \ \mu m < RA1 - RA2 \leq 0 \ \mu m$.

The conditions will be described separately in the following paragraphs.

If Sub-condition a of Condition 1 is satisfied, it means that the projections of the image-side mechanic surface IMS4 of the lens element L4 and the object-side mechanic surface OMS5 of lens element L5 in the direction H do not overlap with each other. If Sub-condition b in Condition 1 is satisfied, it means that the image-side mechanic surface IMS4 and the object-side mechanic surface OMS5 slightly overlap in the direction H. If Condition 2 is satisfied, the projections of the image-side mechanic surface IMS4 and the object-side mechanic surface OMS5 in the direction H will have a larger overlap. In that case, the following phenomena will occur.

Assuming that there is a supporting point P1 inside the light-shielding element BM4, in the assembly process, the object-side mechanic surface OMS5 of the lens element L5 applies to the light-shielding element BM4 a bearing force F1 toward the object side A1, and the bearing force F1 generates a counterclockwise torque on the supporting point P1. Similarly, the image-side mechanic surface IMS4 of the lens element L4 also applies to the light-shielding element BM4 another bearing force F2 toward the image side A2, but the bearing force F2 also generates a counterclockwise torque on the supporting point P1. In the conventional technique, the torques in the same direction generated on the light-shielding element by the two lens elements adjacent to the light-shielding element may cause torque imbalance in the light-shielding element, which may lead to severe deformation of the light-shielding element or eccentricity of the entire optical imaging lens and further affect the optical imaging quality.

However, in this embodiment, the conditional expression "D≤5,000 µm" is applied. Therefore, when subjected to the bearing forces F1 and F2, the light-shielding element BM4 will be supported on the carrying surface S2 of the mounting portion 1126. At the same time, by the carrying surface S2, the mounting portion 1126 may transmit a bearing force F3 toward the image side A2 to carry the light-shielding element BM4, and the bearing force F3 generates a clockwise torque on the supporting point P1 to balance the above counterclockwise torques, which helps address the issue of torque imbalance in the related art and prevent serious deformation of the light-shielding element BM4 and its further influence on the optical imaging quality. In addition, to maintain a buffer space for the optical element closest to the carrying surface S2 in the assembly process and meanwhile address the issue of torque imbalance, the range may preferably be: 1,000 µm≤D≤5,000 µm.

It is noted that if "−200 µm<RA1−RA2≤450 µm" is satisfied, the counterclockwise torques generated by the bearing forces F1 and F2 will be greater. Therefore, depending on the structural strengths of different materials, when the light-shielding element BM4 is metal, it can withstand a greater counterclockwise torque, so it can be adapted to the lens element design ranges in Sub-conditions a and b and has an advantage of enhanced structural strength. When the light-shielding element BM4 is plastic, it can be adapted to the lens element design range in Condition 2 and has advantages of higher production efficiency and lighter weight.

Referring to FIG. 3, FIG. 4, and FIG. 6 at the same time, the light-shielding element BM1 is disposed between the first three lens elements L1 to L3 (e.g., at the lens elements L1 and L2), the vertical distance from the outer edge of the lens element in a first order (i.e., the lens element L2) counted from the light-shielding element BM1 toward the image side A2 to the optical axis I is D1, and the vertical distance from the outer edge of the lens element in a first order (i.e., the lens element L1) counted from the light-shielding element BM1 toward the object side A1 to the optical axis I is D2. The optical imaging lens 100 of this embodiment also satisfies the following Conditional Expressions 1 and 2:

$$300\mu m \leq D1-D2, \text{ and the range is preferably}$$
$$300\mu m \leq D1-D2 \leq 500\mu m. \qquad 1.$$

$$RA4-RA3 \leq -230\mu m, \text{ and the range is preferably}$$
$$-700\mu m \leq RA4-RA3 \leq -230\mu m. \qquad 2.$$

In addition, the optical imaging lens 100 further satisfies the conditional expression: d≤5,000 µm, where d is the minimum distance between the carrying surface S1 of the mounting portion 1123 facing the image side A2 and the optical element closest to the carrying surface S1.

Referring to FIG. 3, assuming that there is another supporting point P2 inside the lens element L2, in the assembly process, the lens element L3 applies to the lens element L2 a bearing force F4 toward the object side A1, and the light-shielding element BM1 applies to the lens element L2 a bearing force F5 toward the image side A2. Similarly, the bearing forces F4 and F5 respectively generate a counterclockwise torque on the supporting point P2. If the bearing forces F4 and F5 alone are applied to the lens element L2, the issues of torque imbalance and eccentricity of the optical imaging lens mentioned in the above paragraphs will occur. However, in this embodiment, the optical imaging lens 100 satisfies the conditional expression: d≤5,000 µm. Therefore, when subjected to the bearing forces F4 and F5, the lens element L2 will be supported on the carrying surface S1 of the mounting portion 1123. At the same time, the carrying surface S1 of the mounting portion 1123 may transmit a bearing force F6 toward the image side A2 to carry the lens element L2, and the bearing force F6 generates a clockwise torque on the supporting point P2 to balance the above counterclockwise torques, which helps address the issue of torque imbalance in the entire optical imaging lens 100 and prevents overall lens eccentricity and its further influence on the optical imaging quality. To maintain a buffer space for the optical element closest to the carrying surface S1 in the assembly process and meanwhile address the issue of torque imbalance, the range may preferably be: 1,000 µm≤d≤5,000 µm.

It is noted that the optical imaging lens 100 of this embodiment has five lens elements and five light-shielding elements and satisfies the above conditional expression designs in different regions B and C. In another unshown embodiment, the optical imaging lens may also only include the lens elements L1 to L3 and the light-shielding elements BM1 and BM2 in FIG. 1 and FIG. 3 and satisfy the conditional expression design as described for region B. In other words, the optical imaging lens of the unshown embodiment is a three-lens element design, and the disclosure is not limited thereto.

Part of the content of the foregoing embodiment applies to the following embodiments, and descriptions of the same technical contents will be omitted. Reference may be made to part of the content of the foregoing embodiment for descriptions of elements of the same names, which shall not be repeated in the following embodiments.

Figure 7:
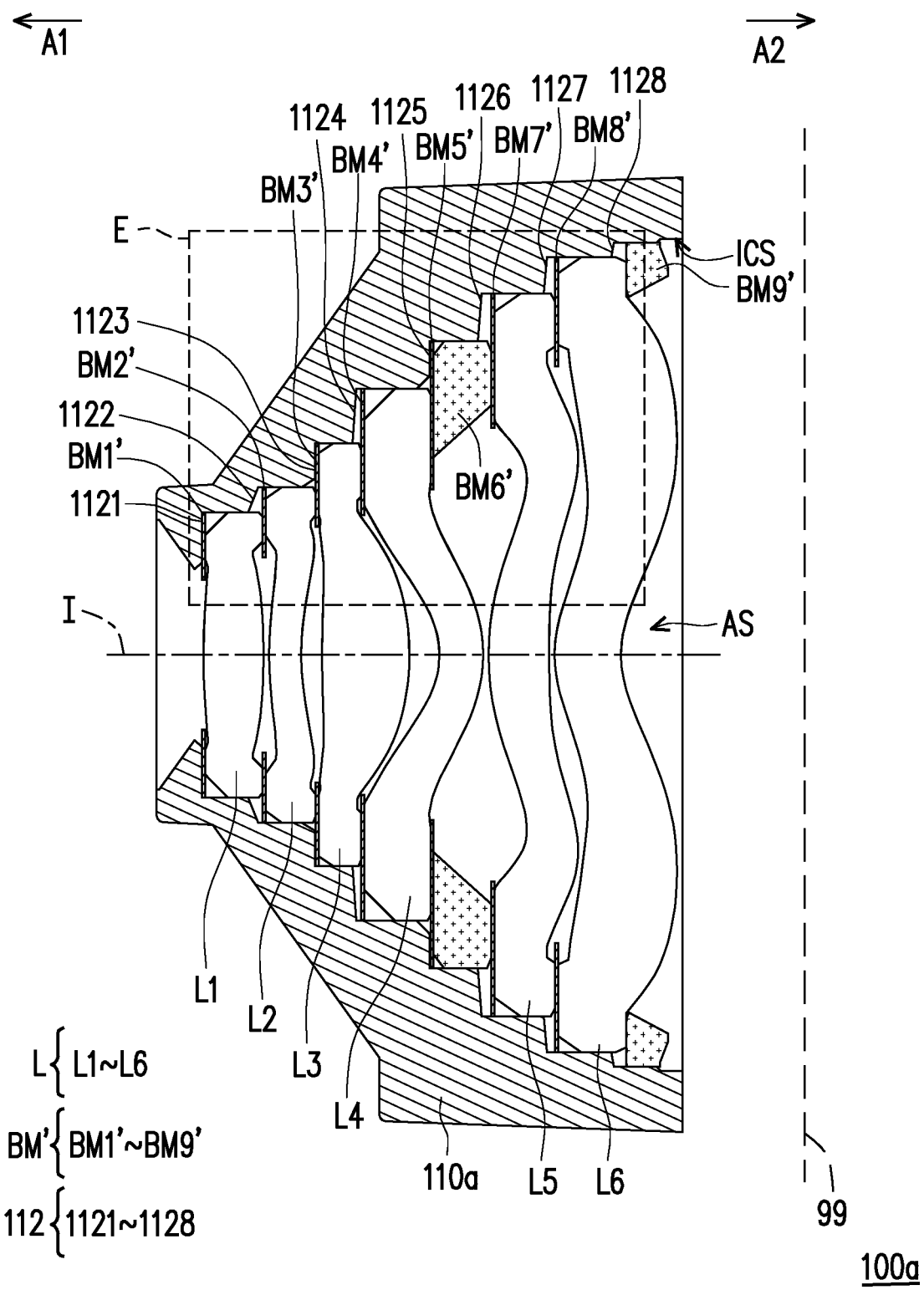
FIG. 7 is a schematic cross-sectional view showing an optical imaging lens according to another embodiment of the disclosure.
Figure 8:
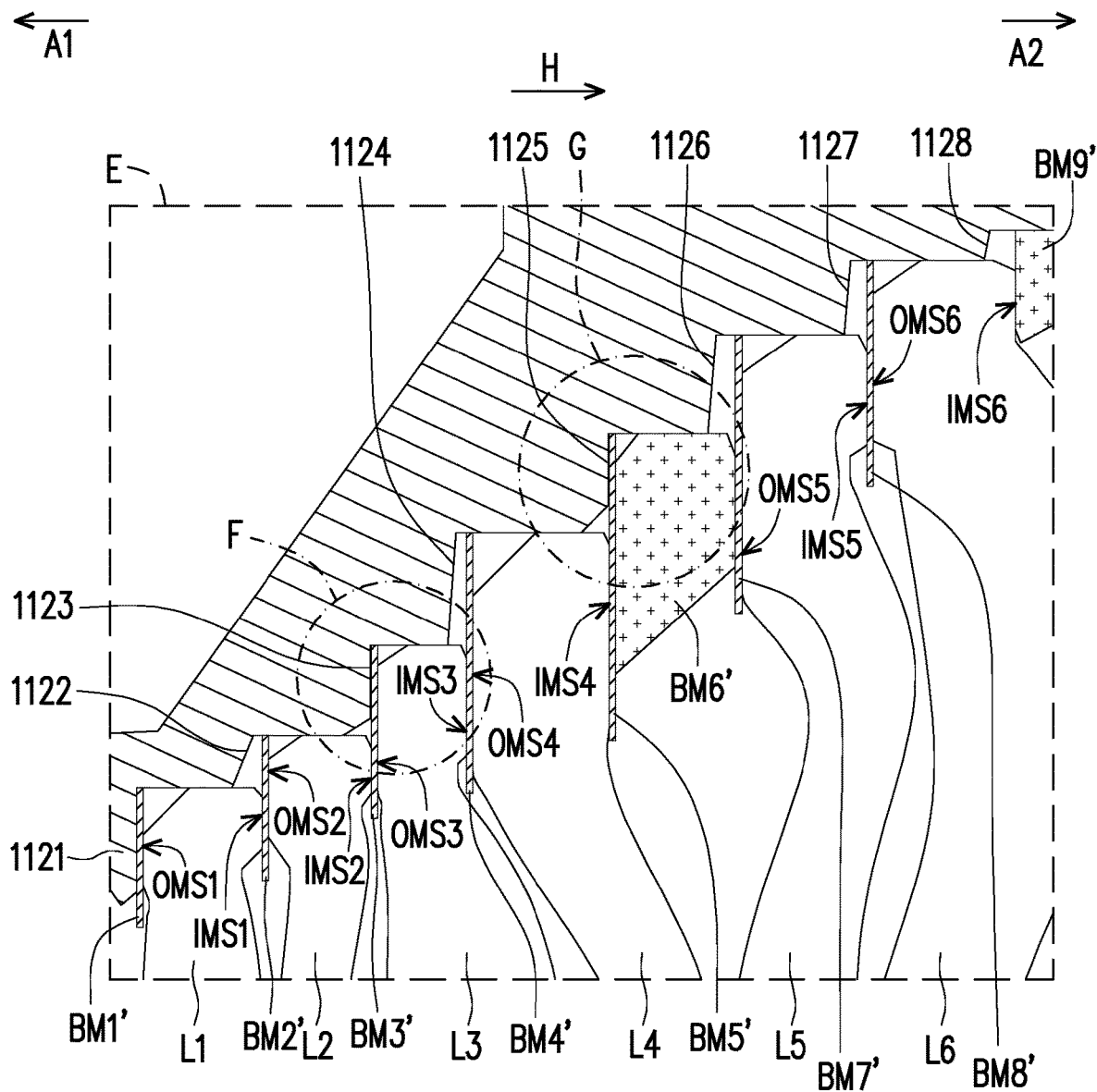
FIG. 8 is a schematic enlarged view showing region E in FIG. 7.
Figure 9:
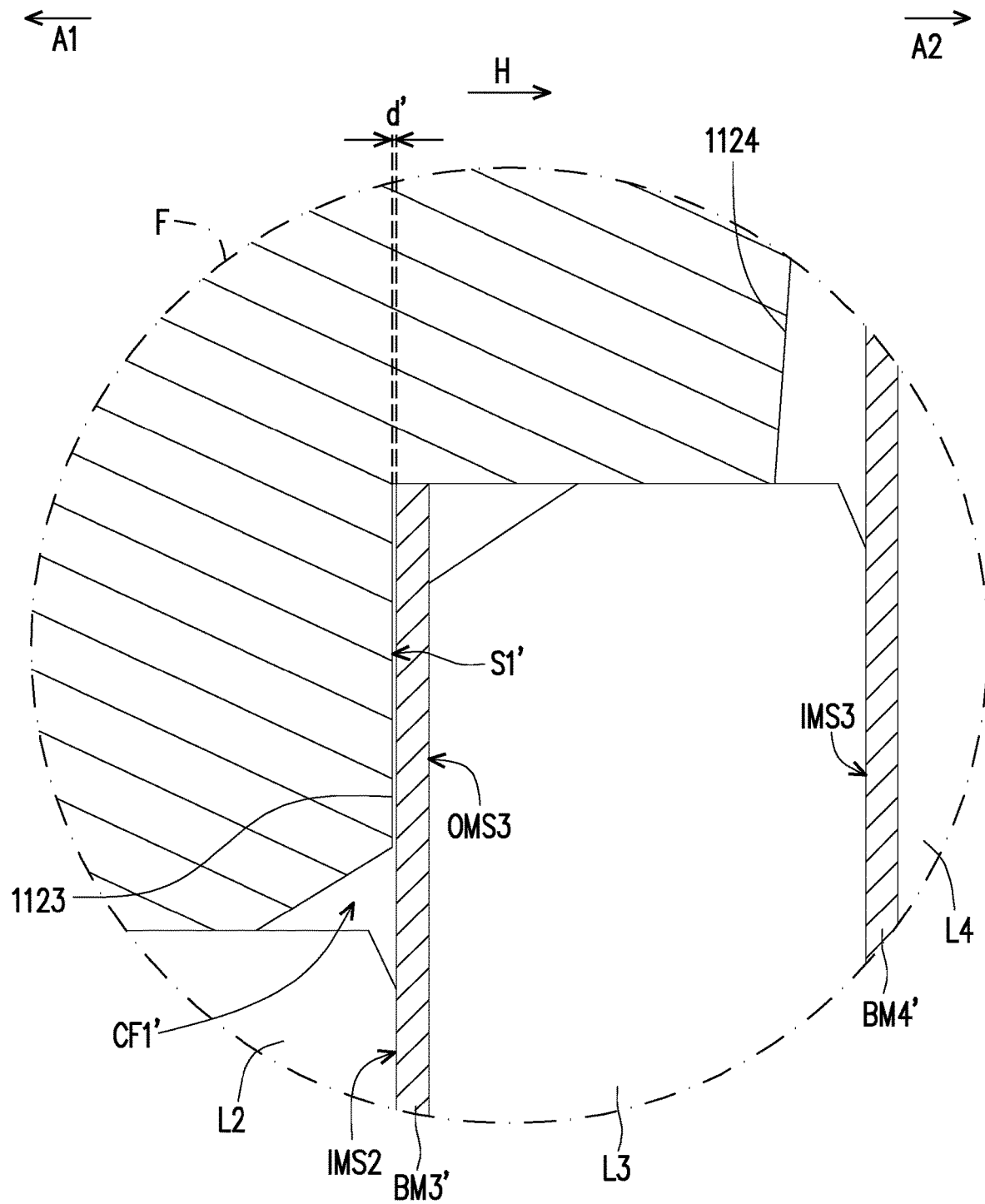
FIG. 9 and FIG. 10 are respectively schematic enlarged views showing regions F and G in FIG. 8.
Figure 10:
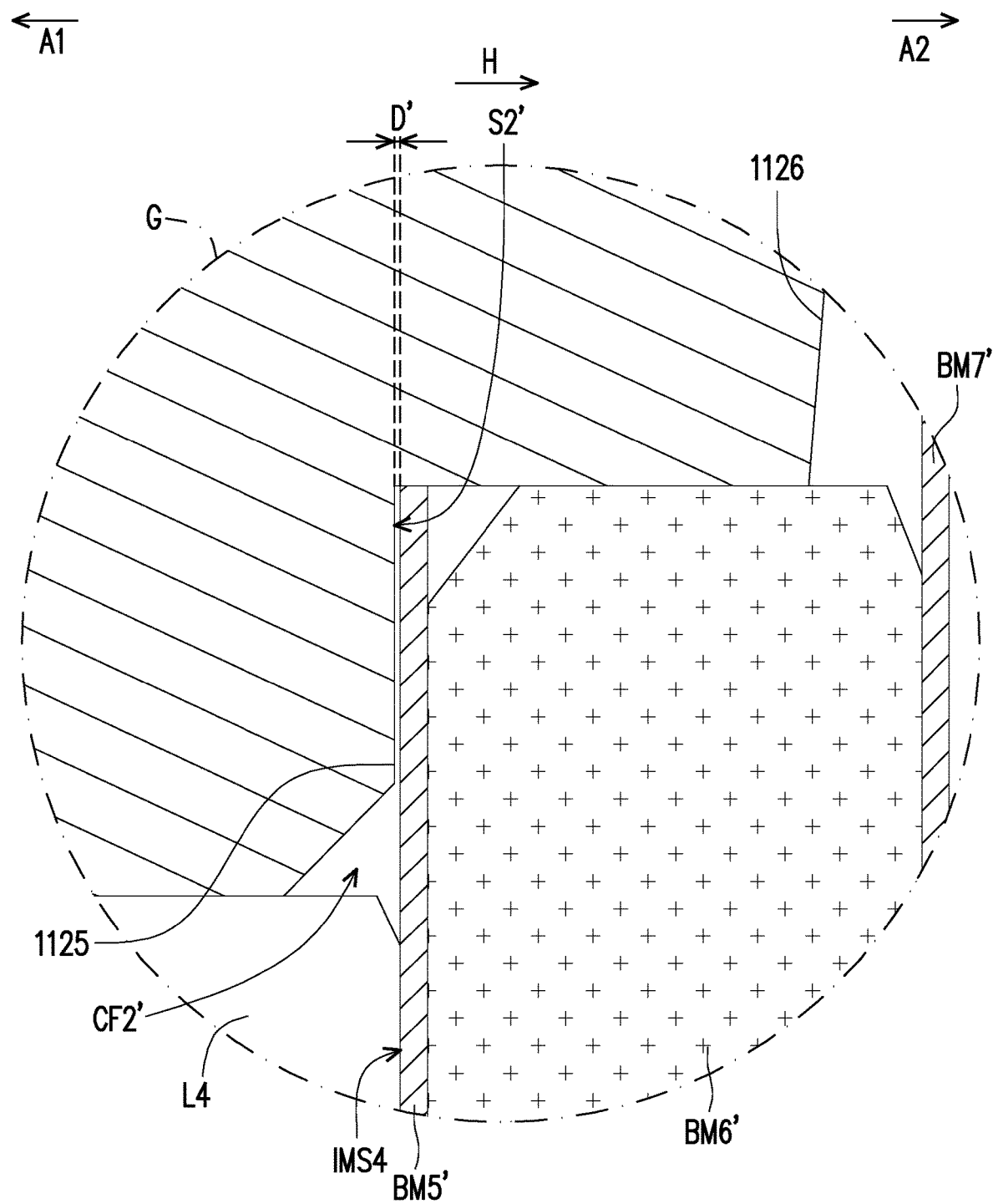
Figure 11:
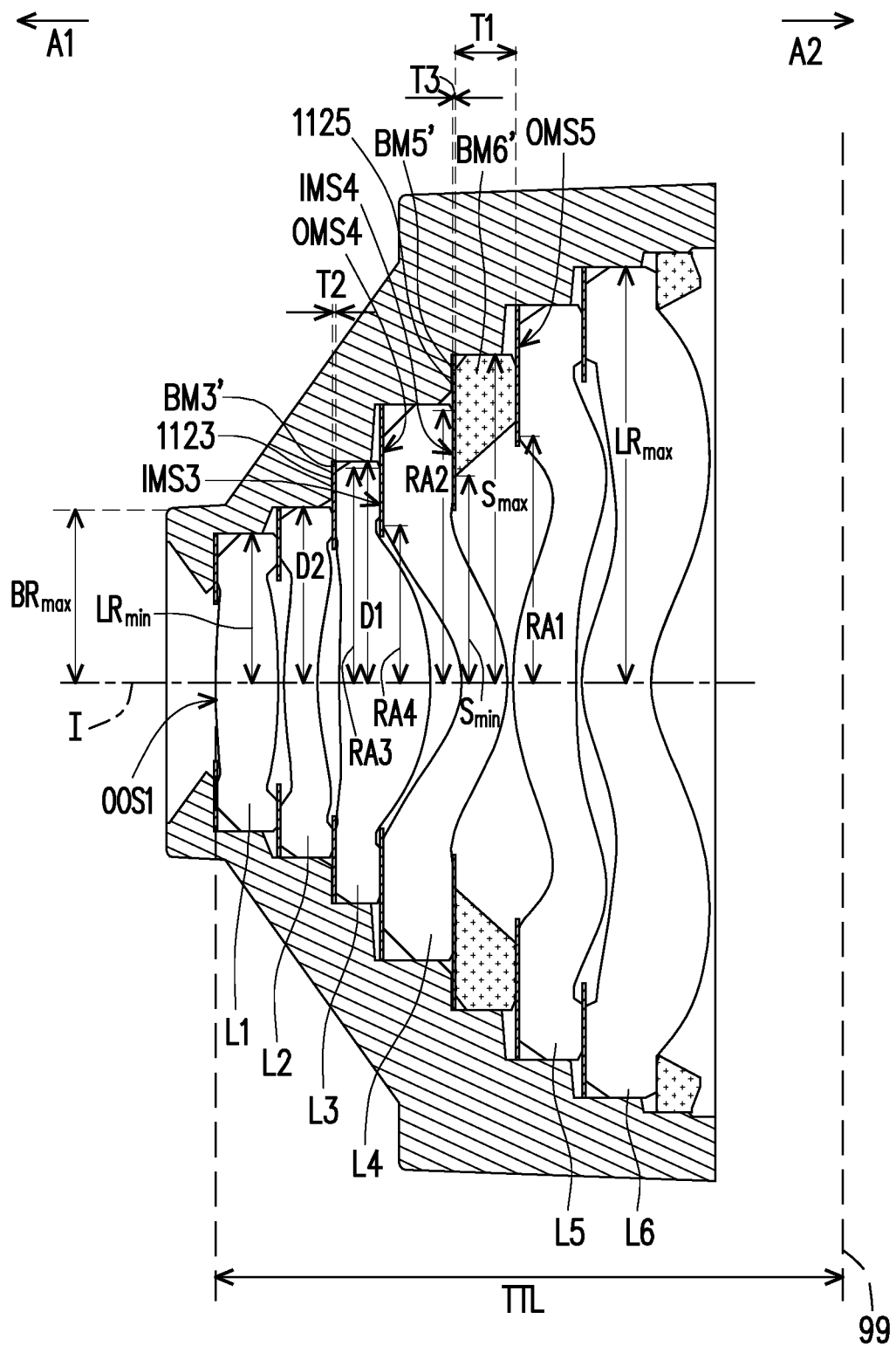
FIG. 11 is a schematic view showing various parameters of the embodiment in FIG. 7.

FIG. 7 is a schematic cross-sectional view showing an optical imaging lens according to another embodiment of the disclosure. FIG. 8 is a schematic enlarged view showing region E in FIG. 7. FIG. 9 and FIG. 10 are respectively schematic enlarged views showing regions F and G in FIG. 8. FIG. 11 is a schematic view showing various parameters of the embodiment in FIG. 7.

An optical imaging lens 100a in the embodiment of FIG. 7 is substantially similar to the optical imaging lens 100 of FIG. 1, and the main difference lies in that the numbers of lens elements L, light-shielding elements BM', and mounting portions 112 of the optical imaging lens 100a are different. Specifically, in this embodiment, the number of the lens elements L is, for example, six, and the lens elements L are sequentially labeled as L1 to L6. The number of the light-shielding elements BM' is, for example, nine, and the light-shielding elements BM' are sequentially labeled as BM1' to BM9', where the light-shielding elements BM' in the form of light-shielding sheets are labeled as BM1' to BM5', BM7', and BM8', and the light-shielding elements BM' in the form of spacers are labeled as BM6' and BM9'. The number of the mounting portions 112 is, for example, eight, and the mounting portions 112 are sequentially labeled as 1121 to 1128.

Referring to FIG. 7 to FIG. 9, when viewed from the object side A1 toward the image side A2, the light-shielding element BM1' is directly supported against the mounting portion 1121. The object-side mechanic surface OMS1 of the lens element L1 is directly supported against the light-shielding element BM1'. The light-shielding element BM2' is interposed between the image-side mechanic surface IMS1 of the lens element L1 and the object-side mechanic surface OMS2 of the lens element L2. The object-side mechanic surface OMS2 of lens element L2 is directly supported against the light-shielding element BM2'. The light-shielding element BM3' is interposed between the image-side mechanic surface IMS2 of the lens element L2 and the object-side mechanic surface OMS3 of the lens element L3, and a gap d' is present between the light-shielding element BM3' and the mounting portion 1123 in a direction H parallel to the direction of the optical axis I (as shown in FIG. 9). The object-side mechanic surface OMS3 of lens element L3 is directly supported against the light-shielding element BM3'. The light-shielding element BM4' is interposed between the image-side mechanic surface IMS3 of the lens element L3 and the object-side mechanic surface OMS4 of the lens element L4. The object-side mechanic surface OMS4 of the lens element L4 is directly supported against the light-shielding element BM4'. The light-shielding element BM5' is interposed between the image-side mechanic surface IMS4 of the lens element L4 and the light-shielding element BM6', and a gap D' is present between the light-shielding element BM5' and the mounting portion 1125 in the direction H parallel to the direction of the optical axis I (as shown in FIG. 10). The light-shielding element BM6' is interposed between the light-shielding elements BM5' and BM7'. The object-side mechanic surface OMS5 of the lens element L5 is directly supported against the light-shielding element BM7'. The light-shielding element BM8' is interposed between the image-side mechanic surface IMS5 of the lens element L5 and the object-side mechanic surface OMS6 of the lens element L6. The light-shielding element BM9' is directly supported against the image-side mechanic surface IMS6 of the lens element L6. In addition, the outer edges of the lens elements L1 to L6 respectively abut against the mounting portions 1121, 1122, 1123, 1124, 1126, and 1127. The outer edges of the light-shielding elements BM1' to BM9' respectively abut against the mounting portions 1121 to 1128.

In addition, referring to FIG. 8 to FIG. 11, the mounting portion 1123 has a carrying surface S1' facing the image side A1. The mounting portion 1125 has a carrying surface S2' facing the image side A1, and the carrying surfaces S1' and S2' carry the closest optical elements. Specifically, in this embodiment, the carrying surface S1' is configured to carry the closest light-shielding element BM3' (as shown in FIG. 9), and the carrying surface S2' is configured to carry the closest light-shielding element BM5' and carry the light-shielding element BM6' (as shown in FIG. 10). Parameter definitions different from the above embodiment are listed below, and reference may be made to the above embodiment for descriptions of other parameters:

RA1 is the vertical distance from the inner edge of the object-side mechanic surface OMS5 of the lens element L5 (i.e., the lens element in a first order counted from the light-shielding element BM6' toward the image side A2) to the optical axis I, as shown in FIG. 11;

RA2 is the vertical distance from the outer edge of the image-side mechanic surface IMS4 of the lens element L4 (i.e., the lens element in a first order counted from the light-shielding element BM6' toward the object side A1) to the optical axis I, as shown in FIG. 11;

RA3 is the vertical distance from the outer edge of the image-side mechanic surface IMS3 of the lens element L3 (i.e., the lens element in a first order counted from the light-shielding element BM3' toward the image side A2) to the optical axis I, as shown in FIG. 11;

RA4 is the vertical distance from the inner edge of the object-side mechanic surface OMS4 of the lens element L4 (i.e., the lens element in a second order counted from the light-shielding element BM3' toward the image side A2; or referred to as a third lens element) to the optical axis I, as shown in FIG. 11;

d' is the minimum distance between the carrying surface S1' of the mounting portion 1123 and the optical element (e.g., the light-shielding element BM3') closest to the carrying surface S1' in the direction H parallel to the optical axis I, as shown in FIG. 9;

D' is the minimum distance between the carrying surface S2' of the mounting portion 1125 and the optical element (e.g., the light-shielding element BM5') closest to the carrying surface S2' in the direction H parallel to the optical axis I, as shown in FIG. 10;

T1 is the maximum thickness of the light-shielding element BM6' in the direction H parallel to the optical axis I, as shown in FIG. 11;

T2 is the maximum thickness of the optical element (i.e., the light-shielding element BM3') closest to the mounting portion 1123 in the direction H parallel to the optical axis I, as shown in FIG. 11;

T3 is the maximum thickness of the optical element (i.e., the light-shielding element BM5') closest to the mounting portion 1125 in the direction H parallel to the optical axis I, as shown in FIG. 11;

D1 is the vertical distance from the outer edge of the lens element L3 (i.e., the lens element in a first order counted from the light-shielding element BM3' toward the image side A2; or referred to as a first lens element) to the optical axis I;

D2 is the vertical distance from the outer edge of the lens element L2 (i.e., the lens element in a first order counted from the light-shielding element BM3' toward the object side A1;

or referred to as a second lens element) to the optical axis I;

$S_{max}$ is the maximum outer diameter of the light-shielding element BM6', i.e., the distance from the outer edge of the light-shielding element BM6' to the optical axis I;

$S_{min}$ is the minimum inner diameter of the light-shielding element BM6', i.e., the distance from the inner edge of the light-shielding element BM6' to the optical axis I;

$LR_{max}$ is the maximum value among the outer edge distances of the lens elements L;

$LR_{min}$ is the minimum value among the outer edge distances of the lens elements L; and $BR_{max}$ is the maximum value of the vertical distance from the outer edge of the lens barrel 110 closest to the object side A1 to the optical axis I.

Similarly, in the optical imaging lens 100a of this embodiment, one of the following conditions is satisfied:

1. −200 μm<RA1−RA2≤450 μm, and the material of the light-shielding element BM6' is metal; by adopting the light-shielding element BM6' of a metal material, an advantage of enhanced structural strength can be achieved.

2. −200 μm≥RA1−RA2≥300 μm, and the material of the light-shielding element BM6' is plastic; by adopting the light-shielding element BM6' of a plastic material, advantages of higher production efficiency and lighter weight can be achieved.

Moreover, the optical imaging lens 100a further satisfies the following conditional expression: D'≤5,000 μm, preferably 1,000 μm≤D'≤5,000 μm, where D' is the minimum distance between the carrying surface S2' of the mounting portion 1125 facing the image side A2 and the optical element closest to the carrying surface S2'. By satisfying such a combination, the optical imaging lens 100a of this embodiment can also solve the issues of torque imbalance and eccentricity of the optical imaging lens in the related art. The principle of the solution is similar to that in the above embodiment and will not be repeatedly described herein.

The optical imaging lens 100a of this embodiment further satisfies the following Conditional Expressions 1 and 2:

300μm≤D1−D2, and the range is preferably
    300μm≤D1−D2<500μm.            1.

RA4−RA3≤−230μm, and the range is preferably
    −700μm≤RA4−RA3≤−230μm.        2.

Moreover, the optical imaging lens 100a further satisfies the following conditional expression: d'≤5,000 μm, and preferably 1,000 μm≤d'≤5,000 μm, where d' is the minimum distance between the carrying surface S1' of the mounting portion 1123 facing the image side A2 and the optical element closest to the carrying surface S1'. By satisfying such a combination, the optical imaging lens 100a of this embodiment can also solve the issues of torque imbalance and eccentricity of the optical imaging lens in the related art. The principle of the solution is similar to that in the above embodiment and will not be repeatedly described herein.

It is noted that the optical imaging lens 100a of this embodiment has six lens elements and nine light-shielding elements and satisfies the above conditional expression designs in different regions F and G. In another unshown embodiment, the optical imaging lens may also only include the lens elements L1 to L4 and the light-shielding elements BM1' to BM4' in FIG. 7, FIG. 8, and FIG. 9 and satisfy the conditional expression design as described for region F. In other words, the optical imaging lens of this embodiment is a four-lens element design, and the disclosure is not limited thereto.

To block stray light, if the air gap between the lens elements is large, the optical imaging lenses 100 and 100a in the above embodiments of the disclosure may further satisfy the following conditional expression: T1≥180 μm, and preferably 180 μm≤T1≤1500 μm, where T1 is the maximum thickness of the light-shielding element BM4 in FIG. 1 and the light-shielding element BM6' in FIG. 7 along the direction H parallel to the optical axis I.

To block stray light, if the air gap between the lens elements is small, in the optical imaging lens 100a in the above embodiment of the disclosure, T2≥255 μm, and preferably 16 μm≤T2≤255 μm, where T2 is the maximum thickness of the optical element (e.g., the light-shielding element BM3') closest to the mounting portion 1123 along the direction H parallel to the optical axis I in FIG. 11.

To better block stray light, in the optical imaging lens 100a in the above embodiment of the disclosure, T3≤255 μm, and preferably 16 μm≤T3≤255 μm, where T3 is the maximum thickness of the optical element (e.g., the light-shielding element BM5') closest to the mounting portion 1125 along the direction H parallel to the optical axis I in FIG. 11.

To improve the imaging quality, the size of the lens element close to the image side A2 may be designed to be larger than the size of the lens element close to the object side A1, but an excessively large difference in the lens element size will result in a decrease in the assembly yield. Therefore, in the optical imaging lenses 100 and 100a in the above embodiments of the disclosure, the following conditional expression may be further satisfied: 1,500≤D1/D2≤5,000. Within the range of this conditional expression, excellent imaging quality and assembly yield can be achieved.

In the optical imaging lenses 100 and 100a in the above embodiments of the disclosure, the following conditional expression may be further satisfied: 1,500≤$LR_{max}$/$LR_{min}$≤5,000. Within the range of this conditional expression, while the imaging quality is improved, the ratio of the area of the lens element L1 closest to the object side A1 to the overall area of the portable electronic device can be reduced.

In the optical imaging lens 100 in the above embodiment of the disclosure, the image-side mechanic surface IMS4 of the lens element L4 (i.e., the lens element in a first order counted from the light-shielding element BM4 toward the object side A1) is closer to the image side A2 than the carrying surface S2 of the mounting portion 1126, and in the optical imaging lens 100a in the above embodiment of the disclosure, the image-side mechanic surface IMS4 of the lens element L4 (i.e., the lens element in a first order counted from the light-shielding element BM5 toward the object side A1) is closer to the image side A2 than the carrying surface S2' of the mounting portion 1125. With this design, it is possible to ensure that the light-shielding elements BM4 and BM5 can effectively transmit a force to the preceding lens element L4, so that the lens element L4 does not shift in the direction H.

In the optical imaging lenses 100 and 100a in the above embodiments of the disclosure, the following conditional expression may be further satisfied: 2,000≤$S_{max}$/$S_{min}$≤20,000. If the ratio of $S_{max}$/$S_{min}$ is greater than 20,000, the lens element will be blocked, which affects the passage of the imaging ray through the lens element. If the ratio of $S_{max}$/$S_{min}$ is less than 2,000, it will be more difficult to have the light-shielding element supported against the adjacent lens element. Therefore, with the above conditional expression satisfied, the above issues can be avoided.

In the optical imaging lenses 100 and 100a in the above embodiments of the disclosure, the following conditional expression may be further satisfied: 1,000≤TTL/$BR_{max}$≤2,500. If this conditional expression is satisfied, the system length of the optical imaging lenses 100 and 100a can be reduced, and the ratio of the area of the lens element L1 closest to the object side A1 to the overall area of the portable electronic device can be reduced.

In the optical imaging lenses 100 and 100a in the above embodiments of the disclosure, the following conditional expression may be further satisfied: 1,200≤TTL/$LR_{min}$≤2,500. If this conditional expression is satisfied, the system length of the optical imaging lenses 100 and 100a can be reduced, and meanwhile, the ratio of the area of the lens element L1 closest to the object side A1 to the area of the portable electronic device can be reduced.

In the optical imaging lens 100 in the above embodiment of the disclosure, the mounting portions 1122 and 1126 respectively have chamfers CF1 and CF2, and in the optical imaging lens 100a in the above embodiment of the disclosure, the mounting portions 1123 and 1125 respectively have chamfers CF1' and CF2'. The chamfer design can provide a space for accommodating the burrs around the lens element to avoid interference with the mounting portion which would affect the assembly yield.

In summary of the above, in the optical imaging lens of the embodiment of the disclosure, when the light-shielding element is metal, the optical imaging lens correspondingly satisfies the following conditional expressions: $-200\ \mu m < RA1-RA2 \leq 450\ \mu m$, and $D$ (or $D'$)$\leq 5{,}000\ \mu m$. When the light-shielding element is plastic, the optical imaging lens correspondingly satisfies the following conditional expressions: $-200\ \mu m \geq RA1-RA2 \geq -300\ \mu m$, and $D$ (or $D'$)$\leq 5{,}000\ \mu m$. In addition, when the light-shielding element is disposed between a lens element in a first order and a lens element in a third order counted from the object side toward the image side, the optical imaging lens correspondingly satisfies the following conditional expressions: $300\ \mu m \leq D1-D2$, $RA4-RA3 \leq -230\ \mu m$, and $d$ (or $d'$)$\leq 5{,}000\ \mu m$. Alternatively, in the optical imaging lens, the first to third lens elements of at least three lens elements correspondingly satisfy the following conditional expressions: $300\ \mu m \leq D1-D2$, $RA4-RA3 \leq -230\ \mu m$, $d$ (or $d'$)$\leq 5{,}000\ \mu m$. When the optical imaging lens satisfies the above combinations of different conditions, a buffer space can be maintained for the optical element closest to the carrying surface in the assembly process and meanwhile the issue of torque imbalance can be solved. Therefore, excellent assembly yield and excellent optical imaging quality can be achieved.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An optical imaging lens comprising:
   a lens barrel having a mounting portion;
   a light-shielding element;
   at least three lens elements sequentially disposed along an optical axis of the optical imaging lens from an object side to an image side, wherein the light-shielding element is interposed between two adjacent ones of the at least three lens elements, each of the lens elements has an object-side mechanic surface facing the object side and an image-side mechanic surface facing the image side, and the object-side mechanic surfaces and the image-side mechanic surfaces are each configured to receive a bearing force,
   wherein the at least three lens elements comprise a first lens element and a second lens element, the first lens element is closer to the image side than the second lens element, no lens element is disposed between the first lens element and the second lens element, a vertical distance from an outer edge of the first lens element to the optical axis minus a vertical distance from an outer edge of the second lens element to the optical axis is larger than or equal to 300 μm,
   wherein the at least three lens elements comprise a third lens element, the third lens element is closer to the image side than the first lens element, no lens element is disposed between the third lens element and the first lens element, a vertical distance from an inner edge of the object-side mechanic surface of the third lens element to the optical axis minus a vertical distance from an outer edge of the image-side mechanic surface of the first lens element to the optical axis is less than or equal to −230 μm,
   wherein the mounting portion is capable of carrying the first lens element, the mounting portion has a carrying surface facing the image side, and a minimum distance is present between the carrying surface and an optical element closest to the carrying surface in a direction parallel to the optical axis, wherein the minimum distance is less than or equal to 5,000 μm,
   wherein a maximum thickness of the light-shielding element in a direction parallel to the optical axis is T1, and the optical imaging lens further satisfies the following conditional expression: $T1 \geq 180\ \mu m$,
   wherein the optical imaging lens satisfies the following conditional expression: $2{,}000 \leq S_{max}/S_{min} \leq 20{,}000$, wherein $S_{max}$ is a maximum outer diameter of the light-shielding element, and $S_{min}$ is a minimum inner diameter of the light-shielding element.

2. The optical imaging lens according to claim 1, wherein a maximum thickness of the optical element closest to the carrying surface in a direction parallel to the optical axis is T2, and the optical imaging lens further satisfies the following conditional expression: $T2 \leq 255\ \mu m$.

3. The optical imaging lens according to claim 1, wherein the vertical distance from the outer edge of the first lens element to the optical axis minus the vertical distance from the outer edge of the second lens element to the optical axis is less than or equal to 500 μm.

4. The optical imaging lens according to claim 1, wherein the vertical distance from the inner edge of the object-side mechanic surface of the third lens element to the optical axis minus the vertical distance from the outer edge of the image-side mechanic surface of the first lens element to the optical axis is larger than or equal to −700 μm.

5. The optical imaging lens according to claim 1, wherein the minimum distance is greater than or equal to 1,000 μm and the minimum distance is less than or equal to 5,000 μm.

6. The optical imaging lens according to claim 1, wherein the mounting portion has a chamfer.

7. The optical imaging lens according to claim 1, wherein each of the lens elements further has an object-side optically non-effective surface facing the object side and including the object-side mechanic surface and an image-side optically non-effective surface facing the image side and including the image-side mechanic surface, an area of the object-side mechanic surface is smaller than an area of the object-side optically non-effective surface, and an area of the image-side mechanic surface is smaller than an area of the image-side optically non-effective surface.

* * * * *